Figure 1:
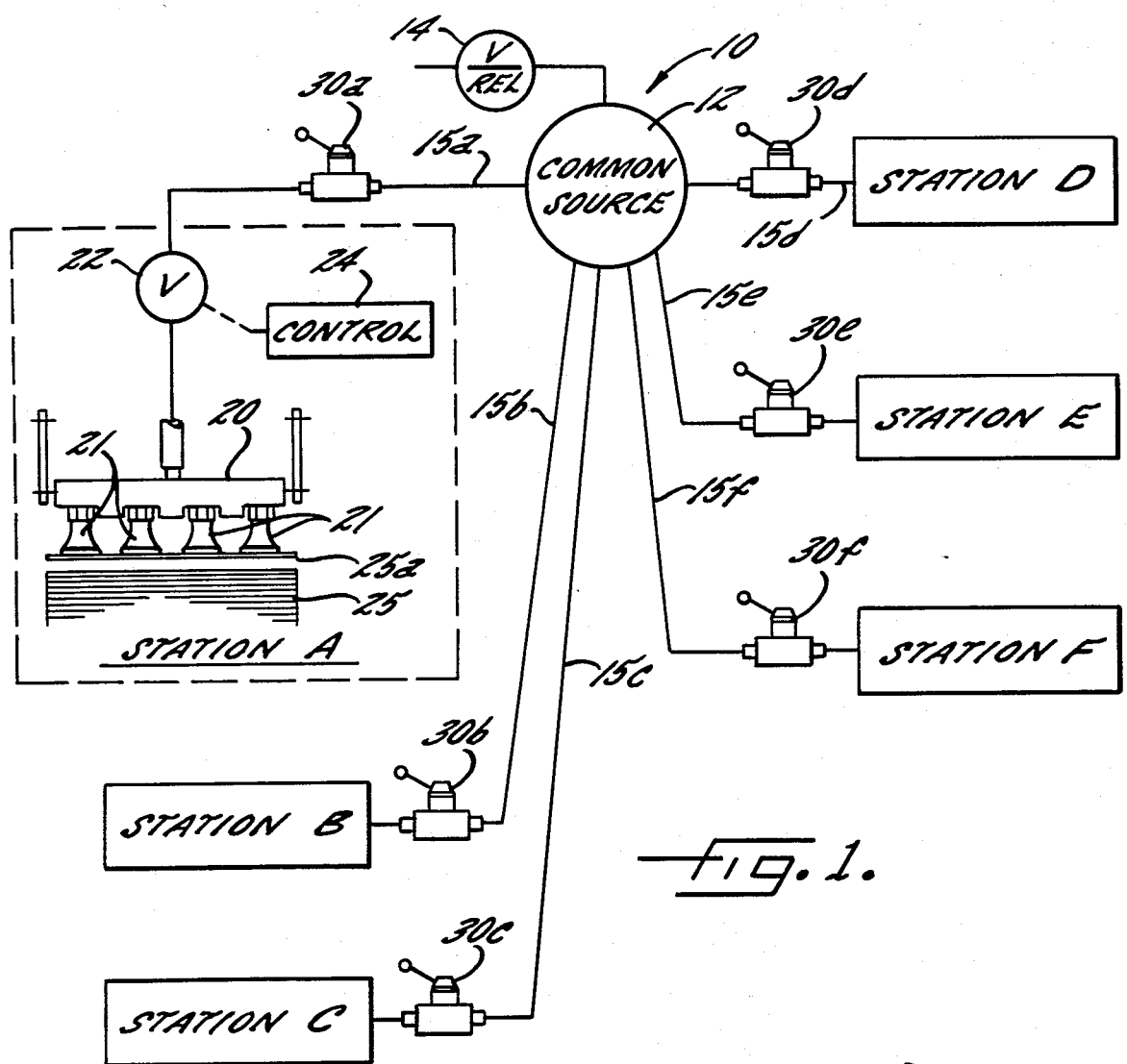

United States Patent [19]

Kist

[11] Patent Number: 4,495,968
[45] Date of Patent: Jan. 29, 1985

[54] PNEUMATIC CONTROL SYSTEM

[75] Inventor: William J. Kist, Barrington, Ill.

[73] Assignee: Combined Fluid Products Company, Highland Park, Ill.

[21] Appl. No.: 398,983

[22] Filed: Jul. 16, 1982

[51] Int. Cl.³ .............................................. F16K 11/10
[52] U.S. Cl. .................................. 137/624.2; 137/607; 137/624.18; 137/870; 137/883; 91/36
[58] Field of Search ............... 137/607, 624.18, 624.2, 137/861, 870, 883, 887; 271/9, 96, 108; 91/36, 38, 219, 521, 522, 523, 527, 530; 60/368, 412

[56] References Cited

U.S. PATENT DOCUMENTS

| | | |
|---|---|---|
| 964,719 | 7/1910 | Wegescheidt . |
| 1,786,969 | 11/1929 | Van Der Heuel . |
| 2,332,244 | 10/1943 | Martin . |
| 2,796,789 | 6/1957 | Rice et al. ............................ 91/36 X |
| 3,139,111 | 6/1964 | Schneider et al. .............. 137/607 X |
| 3,385,572 | 6/1965 | Luoma . |
| 3,530,891 | 9/1970 | Welland . |
| 3,533,442 | 10/1970 | Lange . |
| 4,004,497 | 1/1977 | Scholin et al. ........................... 91/36 |
| 4,076,211 | 2/1978 | Krechel et al. ................. 251/309 X |
| 4,191,215 | 3/1980 | Gonner . |

Primary Examiner—Gerald A. Michalsky
Assistant Examiner—John C. Fox
Attorney, Agent, or Firm—Leydig, Voit, Osann, Mayer & Holt, Ltd.

[57] ABSTRACT

A pneumatic control system for machinery and the like which have a plurality of intermittently operated pneumatic use points or work stations. The system includes a common pneumatic source of sufficient capacity to maintain a predetermined minimum pressure level during the operating sequence of the system, a line connecting each use point to the common source, and a non-pressure responsive, selectively adjustable, throttling valve interposed in each connecting line for establishing a desired pressure at the use point relative to the pressure of the common source. The system is controlled such that the use points draw upon the common source in a predetermined sequence and rate such that the total capacity demand on the common source remains substantially constant, and thus the use point pressures remain constant without the need for relatively expensive pressure regulator valves in the respective use point connecting lines.

10 Claims, 2 Drawing Figures

PNEUMATIC CONTROL SYSTEM

DESCRIPTION OF THE INVENTION

The present invention relates to pneumatic control systems, and more particularly, to pneumatic control systems for machinery with a plurality of different stations or use points which intermittently utilize pneumatic pressure.

Various automatically operated equipment, such as printing presses, packaging machinery, and the like, require the intermittent use of pneumatic pressure, either vacuum pressure or positive pressure, at a plurality of different operating stations in carrying out work operations at such stations. The magnitude of the pneumatic pressure employed and the operating sequence of each station customarily is specifically designed for the work to be performed at the station. Thus, each station may require a different magnitude of pressure and may be operated at different sequences and rates of operation.

Typically, pneumatic systems for such machinery have included a single air source, i.e., a pump, for each use point with a bleeder type relief valve for bleeding air out of or into the system to control the desired pressure or vacuum at the use point. A disadvantage of such approach has been that it has not permitted utilization of the same air source for a plurality of use points and considerable pump capacity is wasted by the bleeding action of the valve for each station.

Alternatively, when a common pneumatic source is used for multiple use points, vacuum or pressure regulators, as the case may be, have been used in each line for establishing and maintaining the desired pressure condition at each use point. Such regulators, however, are relatively expensive, more likely to foul from contaminents, and require greater maintenance.

It is an object of the present invention to provide a more economical, troublefree, pneumatic control system for machinery and the like which utilize a plurality of intermittently operated pneumatic use points.

Another object is to provide a pneumatic control system as characterized above which is adapted to control a plurality of intermittently operated pneumatic use points from a single pneumatic source without the necessity for relatively expensive vacuum or pressure regulators as heretofore required.

A further object is to provide a pneumatic control system of the above kind that is adapted to maintain selectively predetermined, pneumatic conditions at a plurality of intermittently operated pneumatic use points coupled to a single pneumatic source while employing relatively inexpensive throttling or ball valves for establishing use point pressure conditions.

Figure 2:
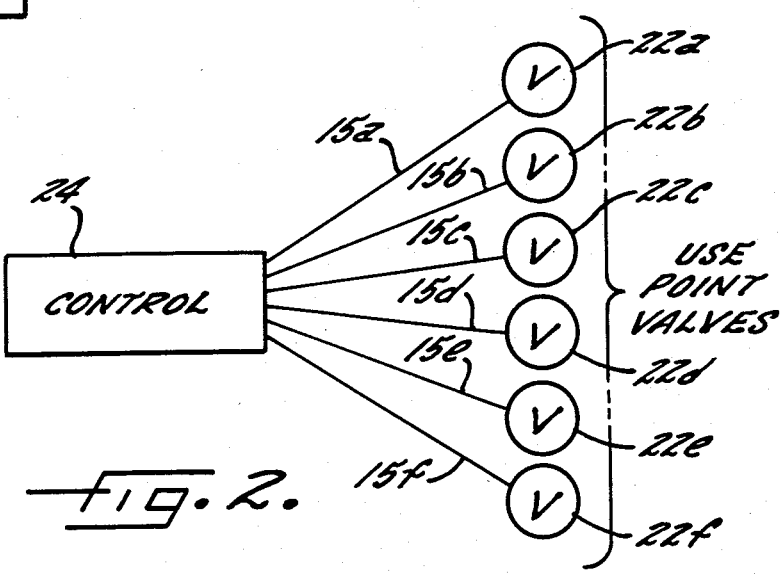

Other objects and advantages of the invention will become apparent upon reading the following detailed description and upon reference to the drawings, in which:

FIG. 1 is a diagrammatic illustration of a pneumatic control system embodying the present invention employed in a multiple operating station machine; and FIG. 2 is a diagrammatic illustration of one form of control for communicating the use points to the common pneumatic source.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the invention is to cover all modifications, alternative constructions and equivalents falling within the spirit and scope of the invention.

Referring now more particularly to FIG. 1 of the drawings, there is shown an illustrative pneumatic control system 10 embodying the present invention utilized in an apparatus having a plurality of operating stations A–F. The pneumatic control system 10 includes a common pneumatic source 12 which can be a conventional vacuum pump adapted to generate and maintain a predetermined vacuum level during operation of the system. To ensure that the vacuum level of the common pneumatic source 12 does not exceed a predetermined maximum level, a spring loaded bleeder-type relief valve 14 in this instance is coupled to the common source. It will be understood that while in the illustrated embodiment the common pneumatic source is a vacuum pressure source, alternatively, it could be a positive pressure source.

The operating stations A–F in the illustrated embodiment each are connected to the common pneumatic source 12 by a respective line 15a–15f. Station A, which is typical of the operating stations and illustrated in more detail in FIG. 1, includes a vacuum head 20 connected to the end of the line 15a and is provided with a plurality of suction cups 21 depending from the underside thereof. For selectively controlling the communication of vacuum pressure from the source 12 to the vacuum head 20 of station A, a control valve 22a is interposed in the line 15a. The valve 22a may be of known type, such as a slide valve, which is adapted to be moved from a open position permitting communication of vacuum pressure to the vacuum head 20 and a closed position isolating the head 20 from the vacuum of the common source 12. The valve 22a may be individually operated at the station A, or alternatively, as illustrated in FIG. 2, a central microprocessor control 24 may be used for coordinating operation of control valves 22a–22f for each of the stations A–F.

In a typical work operation such as in a printing press, the vacuum head 20 may be positioned by appropriate means over a stack of sheets 25, the vacuum head actuated by operation of the valve 22a to communicate a vacuum pressure in the head and cause an inward air flow, and the stack of sheets 25 raised into position such that the upper sheet 25a is engaged by the suction pressure of the vacuum head cups 21. The vacuum head 20 may then be moved by appropriate means to transfer the upper engaged sheet of the stack to a sheet discharge station where the vacuum pressure in the head 20 is terminated through reverse actuation of the control valve 22a allowing the sheet to be deposited at the discharge station. The vacuum head 20 may then be returned to the supply stack 25 for engagement of another sheet.

During such work cycle, it can be seen vacuum capacity demand of the station A on the common vacuum source 12 will be intermittent. Upon actuation of the valve 22a maximum air flow will be drawn through the vacuum head 20 from the source until such time as uppermost sheet 25a is fully engaged by the vacuum head. At that time, the sheet 25a will essentially block further air flow through the head and substantially terminate further demand on the common source 12, except for slight leakage that occurs either between the sheet and the vacuum head, or through the sheet depending upon its porosity. Upon reverse actuation of the control valve 22a, capacity demand on the common source 12 is completely eliminated, which condition continues until the head has returned to its pickup position, where the valve 22a is again opened. Hence, during each operating cycle the vacuum capacity demand for the station is intermittent, and, in some instances, could be limited to a relatively short portion of the operating sequence.

Each of the other operating stations B-F in the illustrated embodiment may be similar sheet transfer stations in a common machine. Depending upon the specific operation to be carried out at each station, the vacuum pressure required and the sequence and rate of operation will vary for each station. It will be understood, of course, that stations A-F could be any form of pneumatic use point, all or some of which intermittently draw upon the common source and some of which may continuously draw on the common source.

Heretofore, when a common pneumatic source has been used for a plurality of intermittently operated work stations or use points, it had been necessary to employ a vacuum or pressure regulator (depending upon whether it is a vacuum or positive pressure system) in each line coupling the common source to the respective station. Such regulators serve to maintain a constant, predetermined pressure at the use point regardless of fluctuations in the source pressure, such as would occur when a plurality of intermittently operated pneumatic use points are simultaneously connected or disconnected from the common source. Such regulators, as previously indicated, are relatively expensive, more likely to foul, and require greater maintenance. Less expensive non-pressure responsive throttling or ball valves heretofore have not been deemed practical for establishing operating station vacuum or pressure conditions in such systems because fluctuations in the common pneumatic source pressure would be proportionally reflected at the operating station, which in some instances can adversely affect or interrupt the work operation at the station.

In accordance with the present invention, the control system is adapted to selectively establish and maintain predetermined pneumatic conditions at each work station coupled to the common pneumatic source without the necessity for expensive pressure regulator valves. To this end, each station is connected to the common source through a respective relatively-inexpensive, non-pressure responsive, throttling valve means, and means are provided for controlling utilization of the use points at a rate and in a predetermined sequence of operation such that the capacity demand on the common pneumatic source remains substantially constant. As will become apparent, the present invention permits the utilization of such non-pressure responsive valves even though all or a substantial portion of the pneumatic use points are operated on an intermittent basis, at different rates, and with different capacity demands and at different levels of pressure during their operating sequence.

For selectively establishing a predetermined vacuum or pressure level at each station use point, in this instance selectively adjustable throttling valves 30a-30f, such ball valves or the like, are interposed in the respective station lines 15a-15f. It will be appreciated that the throttling valves 30a-30f may be of a known, non-pressure responsive type, which permits selective adjustment in the opening in the respective line communicating the common source to the use point, and thereby, permits a determined vacuum pressure and air flow at the station proportionate to the common source.

In the illustrated embodiment, the use points for at least some of the stations are open and draw on the common source at times when the use points for other of the stations are fully closed; the use points of some of the stations operate at such a rapid intermittent rate as to cause a substantially constant draw on the capacity of the common source; and at least some of the use points are intermittently operated at a relatively slow rate such that capacity demand on said use points during a portion of their intermittent cycle is greater than during other portions of the operating cycle. The system is designed and operated such that the use points draw on the common source in such sequence and rates that the total capacity demand on the common source remains substantially constant, which in turn prevents significant pressure fluctuations in the common source which would otherwise be communicated to the use points through the non-pressure responsive throttling valves.

In a working example of the present invention, the common source 12 may be a vacuum pump capable of generating an air flow of 13 standard cubic feet per minute (s.c.f.m.) at a level of 19 inches of mercury (Hg.). The spring loaded bleeder relief valve 14 coupled to the common source 12 may be set so as to prevent any unexpected increase in pressure level, or to maintain such desired level if the common source 12 is of greater capacity than required.

Stations A and B in the illustrated example are designed to have oppositely synchronized demands on the common pneumatic source such that during the period one station is in a vacuum demand condition the other station has no appreciable demand on the common source. The use point of station A in the illustrated system is intermittently operated at intervals such as to draw five s.c.f.m. at 13 inches Hg. when open and during the remainder of the cycle is completely closed either by the valve 22a, or by a sheet covering the suction cups 21 of the vacuum head 20, so as to render the station in a nonvacuum capacity consuming condition. The use point of station B, on the other hand, is designed to draw five s.c.f.m. at 15 inches Hg. when in an open condition and to have a operating sequence exactly opposite to that of the use point of station A. Hence, it will be appreciated that while both stations A and B require a capacity demand of five s.c.f.m. during their interval of use, by appropriate design and coordination of their operation, the two stations together will never draw more than 5 c.f.m. upon the common source, and preferably are design such that a substantially constant demand of 5 c.f.m. exists on the common source. It will be understood that such weighted, sequential use point demand could be employed for more than two use points.

Stations C and D in the illustrated example also are intermittently operated, but in this instance are operated as such rapid rate that each has a substantially constant capacity demand on the common source 12. Through the combined action of the control valve 22c, and closing of the vacuum head suction cups during the station work operation, the pneumatic use point for station C effectively is successively open for 0.1 second, closed for 0.2 seconds, and open for 0.1 second. With the appropriate setting of the throttling valve 30c, the pneumatic use point for station C will have the effect of drawing a substantially constant 2 s.c.f.m. at 12 inches Hg., with the line 15c and throttling valve 30c contributing to dampen the pulsations of the opening and closing action of the valve and suction head cups. Hence, the system may be designed and operated by considering station C as requiring a constant draw of 2 CFM at 12 inches of Hg. Station D is operated at a rapid opening and closing sequence of 0.1 second each so as to similarly have a substantially constant draw on the common source of 4 s.c.f.m. at 16 inches of Hg.

Finally, the use points of stations E and F in the illustrated example are operated at a relatively slow rate and under conditions so as to draw one volume of air during a portion of the operating cycle, a lesser volume of air during another portion of the operating cycle, and have no appreciable demand on the capacity of the common source during yet another portion of the cycle. Such conditions can occur when the control valves 22e, 22f are opened at a relatively slow rate so that the capacity draw at the beginning of the cycle is less than when the valve is completely open. Such variable demand conditions also can occur when the control valve is quickly opened and then the suction heads are closed by porous sheet material which allows limited air flow through the sheet. One skilled in the art will appreciate that there are numerous other work operations in which the capacity demand for a station will vary during the operating cycle. In the illustrated example, the variable demand stations E and F are sequentially operated so that jointly they also result in a substantially constant demand on the common source, as illustrated in the following chart:

| Segment of Operating Station Cycle | Capacity Demand of Station E | Capacity Demand of Station F | Combined Capacity Demand of Stations E and F |
|---|---|---|---|
| 1/6 | 2 scfm 15" Hg. | 0 scfm 17" | 2 scfm |
| 2/6 | 1 scfm 16" Hg. | 0 scfm 17" | 1 scfm |
| 3/6 | 0 scfm 17" Hg. | 1 scfm 16" | 1 scfm |
| 4/6 | 0 scfm 17" Hg. | 2 scfm 15" | 2 scfm |
| 5/6 | 0 scfm 17" Hg. | 1 scfm 16" | 1 scfm |
| 6/6 | 1 scfm 16" Hg. | 0 scfm 17" | 1 scfm |

It can be seen that while stations E and F each have variable capacity demands on the common source from 0 to 2 s.c.f.m., the combined demand is nearly constant, being between 1 and 2 s.c.f.m. Further, the operating rate of valves 22e and 22f, while alone not adequate to produce the substantially constant demand similar to valves 22c and 22d described above, contribute to further stabilizing the demand of stations E and F to become substantially constant.

From the foregoing, it can be seen that the combined capacity demand of all six stations A through F on the common source 12 remains substantially constant, i.e. between about 12 and 13 s.c.f.m., throughout the cycle of operation of the system, notwithstanding that individually the stations could require a significantly greater total capacity. By appropriate design and operation of a system in accordance with the present invention, therefore, it is possible to use a smaller capacity common source than otherwise necessary. Moreover, since the total capacity demand for all the stations is substantially constant, relatively inexpensive throttling valves may be used in each station line for establishing the desired pressure condition at the respective station. While the illustrated embodiment has been described with three different forms of intermittently operated use points, various other intermittent modes of operation could also be employed. Furthermore, one or more continuously open use points also could be operated from the common source in combination with the intermittently operated use points so long as adequate source capacity is provided.

It can be seen, therefore, that the present invention provides a relatively economical pneumatic control system for machinery and the like which require a plurality of intermittently operated pneumatic use points. In addition, it will be appreciated that the present invention permits relatively easy, low cost, retrofitting of existing machinery.

I claim:

1. A pneumatic control system comprising a common pneumatic source of sufficient capacity to maintain a determined air flow at a predetermined minimum pressure level during the operating sequence of the system,
   a plurality of intermittently operated pneumatic use points each adapted to draw upon the capacity of said common pneumatic source during their operation,
   means connecting each said use point to said common source,
   non-pressure responsive selectively adjustable throttling valve means interposed in each said connecting means for establishing and maintaining a predetermined relatively constant pressure at said use point during the operating sequence of said system, said throttling valve means being set to establish different pressures at at least some of said use points, and
   means for controlling the operating sequence and rate of operation of said use points such that the draw upon the capacity of said common source by said use points remains substantially constant throughout their operation.

2. The pneumatic control system of claim 1 in which said controlling means causes at least some of said use points to draw on said common pneumatic source at times when other of said use points do not draw on the capacity of said common source, and said controlling means causes said other use points to draw on said common source during times when said some use points do not draw upon the capacity of said common source.

3. The pneumatic control system of claim 1 in which said controlling means causes at least some of said use points to be intermittently utilized at such a rapid rate as to cause a relatively constant draw on the capacity of said common pneumatic source.

4. The pneumatic control system of claim 1 in which said controlling means causes some of said use points to be intermittently operated at a relatively slow rate such that the draw on the capacity of said common source by said some use points during a portion of their intermittent cycle of operation is greater than during other portions of said operating cycle, and said controlling means causes said some use points to draw on said common source in timed sequences such that there is a substantially constant total draw on the capacity of said common source from said some use points.

5. The pneumatic control system of claim 1 in which said controlling means includes a selectively operable valve for each use point connecting means and valve control means for opening and closing said selectively operable valves in a predetermined timed sequence.

6. The pneumatic control system of claim 1 including relief valve means coupled to said common source for limiting the maximum pneumatic condition of said common source.

7. The pneumatic control system of claim 1 in which said controlling means causes at least some of said use points to draw on said common pneumatic source at times when other of said use points do not draw on the capacity of said common source.

8. The pneumatic control system of claim 7 in which controlling means causes at least some of said use points to be intermittently utilized at such rapid rate as to cause a relatively constant draw on the capacity of said common pneumatic source, and said controlling means causes some of said use points to be intermittently operated such that the draw on the capacity of said common pneumatic source by said some use points during a portion of their intermittent cycle of operation is greater than during other portions of said operating cycle.

9. The pneumatic control system of claim 8 in which said controlling means includes a selectively operable valve for each use point connecting means, and valve control means for opening and closing said selectively operable valves in a predetermined timed sequence.

10. The pneumatic control system of claim 1 in which at least some of said use points have greater draw on the capacity of said common pneumatic source during a portion of their intermittent cycle of operation than during other portions of their cycle of operation, and said controlling means causes said some use points to be intermittently utilized at such rate and sequence as to result in a substantially constant draw on the capacity of said common source.

* * * * *